United States Patent [19]
Ullmann et al.

[11] 3,731,044
[45] May 1, 1973

[54] ELECTRO-ERODING MACHINE WITH A CIRCUIT FOR THE CONTROL OF AT LEAST ONE ADVANCING DEVICE FOR A WIRE ELECTRODE AND/OR FOR A WORKPIECE

[75] Inventors: Werner Ullmann, Locarno-Muralto; Laszlo Rabian, Locarno-Monti; Silvano Mattei, Locarno-Solduno; Arno Sieg, Locarno; Peter Suter, Locarno; Costantino Tadini, Locarno, all of Switzerland; Rudolf Panschow, Hannover, Germany; Volker Suhr, Neustadt, Ruebengerge, Germany; Wolfgang Meyer, Hannover, Germany

[73] Assignee: Agie, A.G. fur industrielle Elektronik, Losone-Lorcarno, Switzerland

[22] Filed: June 23, 1971

[21] Appl. No.: 156,007

[30] Foreign Application Priority Data
July 3, 1970 Switzerland..........................10/23

[52] U.S. Cl............219/69 V, 204/143 M, 219/69 G
[51] Int. Cl..........B23p 1/04, B23p 1/12, B23p 1/14
[58] Field of Search................219/69 C, 69 G, 69 P, 219/69 R, 69 V; 204/143 M

[56] References Cited
UNITED STATES PATENTS

| 2,974,216 | 3/1961 | Inoue | 219/69 V |
| 3,591,761 | 7/1971 | Bederman et al. | 219/69 V |
| 3,610,864 | 10/1971 | Kholodnov | 219/69 V |

*Primary Examiner*—R. F. Staubly
*Attorney*—L. Gaylord Hulbert et al.

[57] ABSTRACT

This invention relates to an electro-eroding machine with a circuit for the control of at least one advancing device for a wire electrode and/or for a workpiece in a workpiece contour predetermined by data stored in an information carrier, the said data being converted, in consideration of the diameter of the wire electrode and the width of the operating gap, into the path curve of the axis of the wire electrode in consideration of the erosive condition in the operating gap. The information carrier comprises two computing units, one supplying control signals to driving means for advancing the wire electrode for a straight movement while the other supplies control signals to driving means for producing rotary movement. Each computing unit includes return memories which return the wire electrode by a certain length of the path curve in the event of trouble in the operating gap.

14 Claims, 8 Drawing Figures

Patented May 1, 1973 3,731,044

INVENTORS
WERNER ULLMANN
LASZLO RABIAN
SILVANO MATTEI
ARNO SIEG
PETER SUTER
COSTANTINO TADINI
RUDOLF PANSCHOW
VOLKER SUHR
WOLFGANG MEYER

BY
ATTORNEYS

INVENTORS
WERNER ULLMANN
LASZLO RABIAN
SILVANO MATTEI
ARNO SIEG
PETER SUTER
COSTANTINO TADINI
RUDOLF PANSCHOW
VOLKER SUHR
WOLFGANG MEYER

BY
ATTORNEYS

INVENTORS
WERNER ULLMANN
LASZLO RABIAN
SILVANO MATTEI
ARNO SIEG
PETER SUTER
COSTANTINO TADINI
RUDOLF PANSCHOW
VOLKER SUHR
WOLFGANG MEYER

BY

ATTORNEYS

ELECTRO-ERODING MACHINE WITH A CIRCUIT FOR THE CONTROL OF AT LEAST ONE ADVANCING DEVICE FOR A WIRE ELECTRODE AND/OR FOR A WORKPIECE

In the known programme-controlled electro-eroding machines either a shaped electrode or a wire electrode is employed. Stored in an information carrier in the manner known, which may be a punched tape, are the data of the workpiece contours to be produced. On the strength of these data an electrical circuit controls the relative movement between the electrode and the workpiece. The use of a wire electrode enables complex workpiece contours such as those of punching tools, gears or bevel gears to be produced better than with a shaped electrode. The control of the wire electrode, however, raises particular problems which cannot readily be solved by the control arrangements of chip-removing machine tools. A circuit specially designed for the control of the relative movement between the wire electrode and the workpiece is known. Practice has shown that the particular problems arising in the erosive production of complex workpiece contours have not been satisfactorily solved. This is due partly to the fact that the expenditure for the numerical control should be reasonably proportionate to the expenditure for the electro-eroding machine. This is why the known numerical control is limited to just a few machining processes. A further disadvantage resides in the fact that such control cannot be enlarged by additional circuit units. This disadvantage caused by circuit organization can in principle be removed only by an increase in the expenditure for programming. However, this is undesirable since the expenditure for the numerical control must be reasonably proportionate to the expenditure of the eroding machine. This condition must be particularly considered if further fields of application are to be made accessible to the numerically controlled wire electrode.

It is one object of this invention to provide a control system built of simple components which ensures simple programming even for complex cut shapes and, respectively, workpiece contours. This is particularly the case with periodically repeated curves which are composed into a workpiece contour or cut configuration. Only one such curve length need be programmed so that the production of a gear or bevel gear requires the programming of only one involute or a cycloid. The involute is produced, as is well known, by superposing a straight movement and a rotary movement. As is well known, the cycloid is produced by superposing a circular movement and a rotary movement. The circuit according to this invention utilizes the known generating rules for curves and, respectively, curve lengths to control the relative movement between the wire electrode and the workpiece in the manner desired, particular weight being attached to the simplicity of programming.

A further object of this invention is the clear basic conception of the control system so that additional advantages for special erosive problems can readily and easily be incorporated in, or switched into, the system. This so-called construction block principle makes the control system capable of being enlarged and adapted to the wishes of the various customers. Regarded as special problems is the conical or oblique "cutting" of workpiece contours and the adjustment of the control system to particular embodiments of the advancing device for the wire electrode and/or the workpiece. Depending on whether complex or simple workpiece contours are to be cut, different embodiments of the advancing device are adopted. Depending on the type of the desired workpiece contour, the characteristic path points stored in an information carrier can be programmed on cartesian and/or polar co-ordinates. The adjustment of the control system to the advancing device and the programming is therefore of great importance.

According to this invention, not only the data for the desired cut shape and, respectively, workpiece contour are to be used which are converted into the path of the wire axis of the wire electrode, but also further data for the control of the electrical parameters (e.g. current, voltage, repetitive frequency, width, interval of impulses and/or double impulses and, respectively, ignition impulses) on the erosion generator or generators and for the control of the flushing conditions of the dielectric liquid are employed.

The invention is characterized by the fact that at least two computing units are provided which calculate the path curve of the axis of the wire electrode by virtue of the converted data and of a predetermined programme, of which the one computing unit supplies, by means of an interpolation process, control signals to driving members of the advancing device for a straight movement while the other computing unit supplies, by means of an interpolation process, control signals to driving members of the advancing device for a rotary movement of each computing member comprising return memories which return the wire electrode, in the presence of trouble in the operating gap, by a certain length on the path curve.

Embodiments of the invention will now be described in greater detail with reference to the drawings in which.

Figure 1:
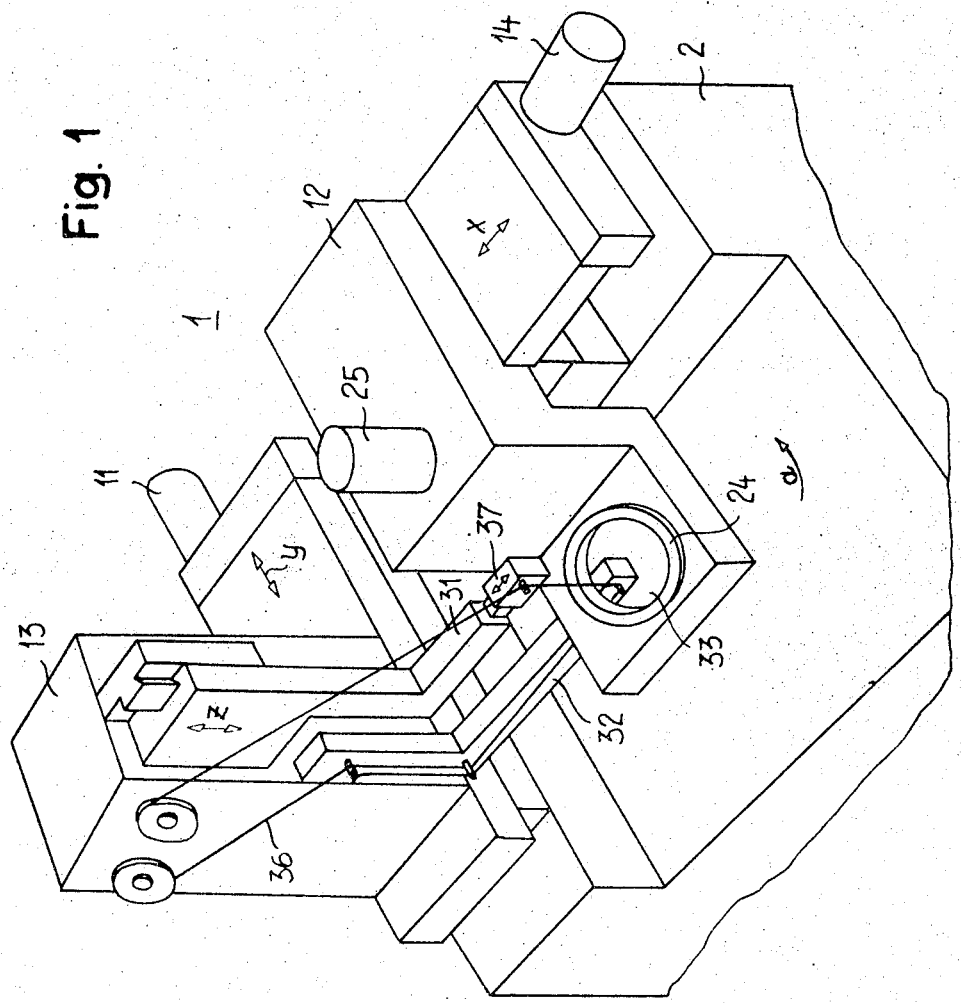
FIG. 1 is a perspective view of an advancing device with a cross-table and a rotary table.

According to FIG. 1 the advancing device 1 for the straight movement is mounted on the base 2 of the electro-eroding machine. One mobile component 12 is moved in the direction of the x-co-ordinate by the driving motor 14 and the other mobile component 13 in the direction of the y-co-ordinate by the driving motor 11.

Attached to mobile component 12 is the advancing device for the rotary movement and this advancing device is designed as a rotary table 24. This rotary table 24 accommodates the workpiece 33. The workpiece 33 is symbolized only by its reference numeral in FIG. 1. The driving motor 25 rotates the rotary table 24 so that the workpiece 33 is rotated relative to the wire electrode 36. The workpiece 33 is naturally immersed in a dielectric medium which may by way of example be a liquid. Attached to the mobile portion 13 of the advancing device 1 is the holding device which consists of the two wire guides 31, 32. The wire electrode 36, which as is well known consists of a wire about 100 meters long and which is wound on, and unreeled from, spools, obtains the desired tension by the two guides 31, 32 and is displaced relative to the workpiece 33 in the direction of the y-co-ordinate. In operation, the wire electrode 36, as is well known, is wound on a spool (not shown) from a supply spool (not shown) via the guide rollers indicated in FIG. 1 and the two wire guides 31, 32. The displacement of the wire electrode 36 relative to the workpiece 33 is effected by driving motors 11, 14, 25 connected with the associated outlets of the circuit shown in FIG. 5. The circuit, which will be described in greater detail with reference to FIG. 5, supplies, by virtue of the data in the information carrier, the control impulses to the driving motors 11, 14, 25 so that the relative displacement between the wire electrode 36 and the workpiece 33 in the direction of the x, y and α-co-ordinates is controlled. These co-ordinate directions are indicated by arrows in FIG. 1. The α-co-ordinate represents the angle of rotation of the rotary table 24. This produces cylindrical cut configuration on a polar co-ordinate and/or a cartesian co-ordinate system. The utilization of the kinematic generating rules, such as involutes (superposition of a straight movement and a rotary movement), cycloids (superposition of a circular movement and a rotary movement), ensures complex path curves to be achieved on the workpiece 33 with simple programming of the desired contours. However, if less complex cut configurations are to be produced in the workpiece 33, the rotary table 24 may be stationary so that displacement is effected only in the directions of the x and y-co-ordinates. It becomes thus possible for the relative movement between the wire electrode 36 and the workpiece 33 to be controlled by the cartesian and/or polar system of co-ordinates. It is here essential that the programming of the desired cut configurations in the workpiece 33 can be simplified.

Figure 6:
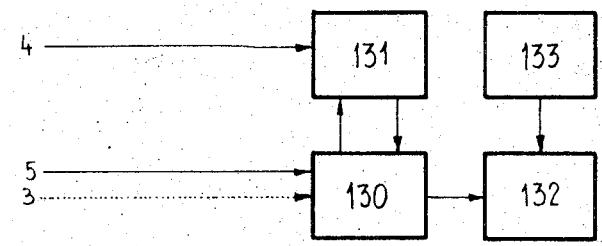
FIG. 6 shows additional components of the circuit for the setting of a certain angle between the wire electrode and the surface of the workpiece.

In FIG. 1 the wire guide 31 comprises a device 37 for the adjustment of the angle of the wire electrode 36 relative to the surface of the workpiece 33. This enables a workpiece contour to be cut conically. The device 37 may be actuated in the direction of the arrow either manually or by the components of the circuit shown in FIGS. 6 and 7. In FIG. 1 the wire electrode 36 forms an angle of 90° with the surface of the workpiece 33. The wire guide 31 is arranged on the mobile component 13 so as to be displaceable in the z-direction. This makes it possible for the gap width, i.e. the distance between the rest points of the two wire guides 31, 32, to be modified. If e.g. a conical cut is to be produced, displacement in the z-direction enables the angle between the wire electrode 36 and the surface of the workpiece 33 to be changed, the device 37 not requiring actuation in the direction of the arrow.

Figure 2:
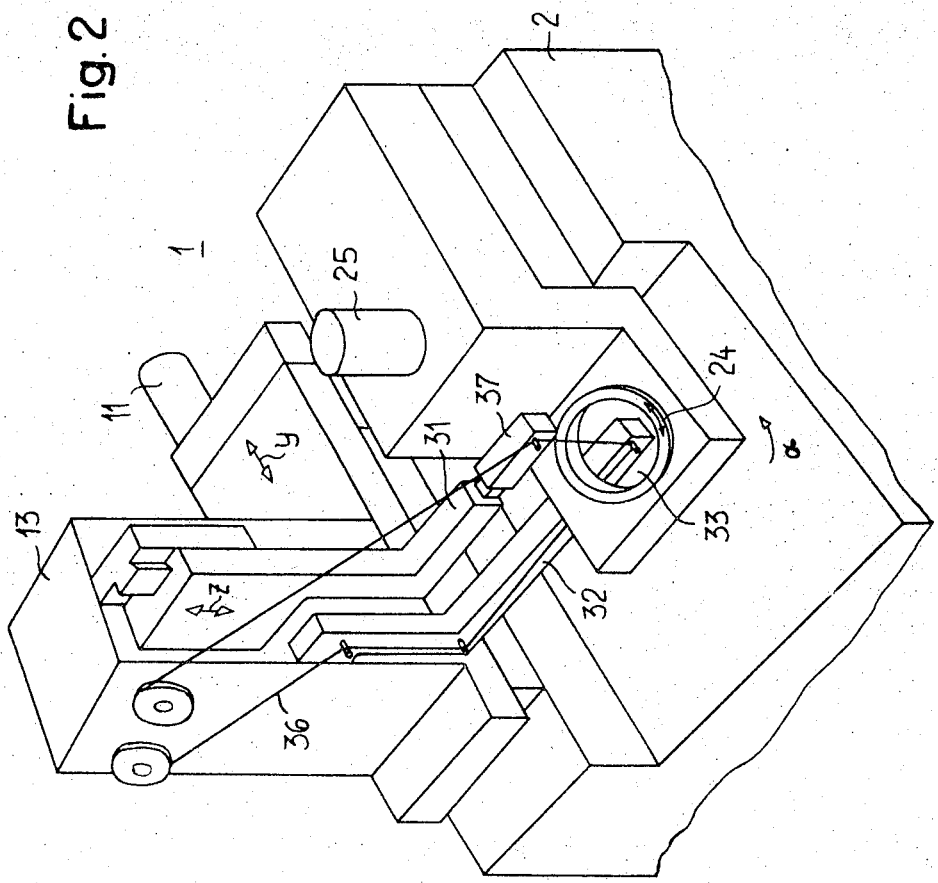
FIG. 2 shows a simplified advancing device with a rotary table and with a displacement possibility in one direction.

In FIG. 2 the advancing device 1 consists of only the mobile component 13 which can be displaced on the y-co-ordinate by means of the driving motor 11. The rotary table 24 to which the workpiece 33 (not shown) is attached is firmly connected with the base 2 of the eroding machine. The two wire guides 31, 32 for the wire electrode 36 are arranged, as previously described in connection with the previous flange, on the mobile component 13. The upper wire guide 31 can here be displaced in the z-direction as well. The device 37 for the adjustment of the angle between the wire electrode and the surface of the workpiece is actuated either manually or by the components of FIGS. 6, 7. With this simple embodiment of the advancing device according to FIG. 2 only part of the workpiece contours and, respectively, cut configurations can be produced which the advancing device according to FIG. 1 enables to be made. The embodiment according to FIG. 2 is designed only to show that embodiments of the devices for the advance of the wire electrode 36 and the workpiece 33 can be adjusted to any machining process with simple means.

Figure 3:
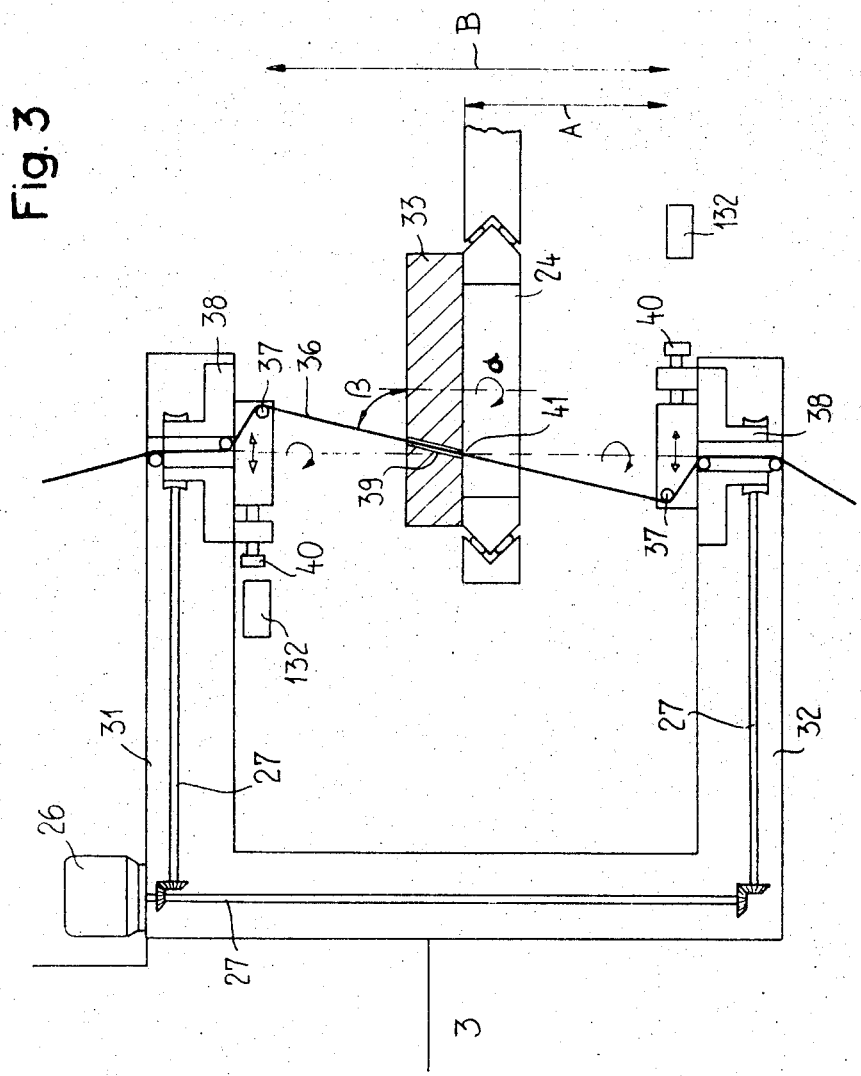
FIG. 3 shows a holding device with two small rotary tables for the wire electrode.
Figure 5:
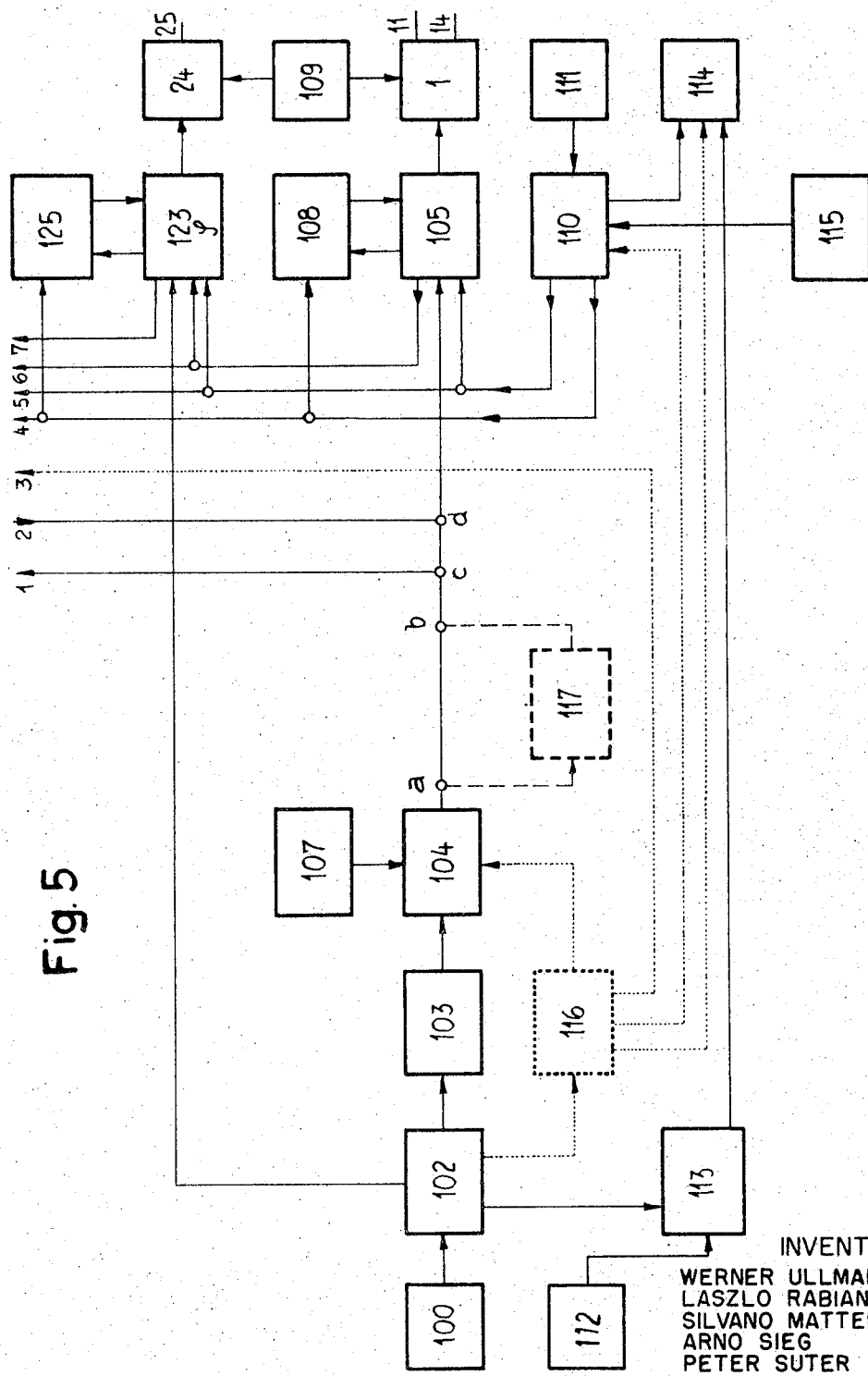
FIG. 5 is a box-type view of the circuit for the control of the relative movement between the wire electrode and the workpiece.

FIG. 3 shows a holding device 3 for the wire electrode 36. The two wire guides 31, 32 each have a small rotary table 38. Arranged on these rotary tables are the guide pins 37. The wire electrode 36 is taut between these guide pins 37 and, as is well known, runs in one direction during the erosion process, e.g. upwards, through an opening in the lower wire guide 32, via the pin 37 of the lower rotary table, through the workpiece 33 arranged on the rotary table 24, via the pin 37 of the upper small rotary table 38, through an opening in the upper wire guide 31, to the take-up spool (not shown). The holding device 3 may be attached to the mobile component 13 of the advancing device 1 in FIGS. 1 and 2. The wire guides shown in FIGS. 1 and 2 with the device 37 for the adjustment of the angle between the wire electrode 36 and the surface of the workpiece 33 are thus replaced by the holding device 3 in FIG. 3. The wire electrode 36 and the surface of the workpiece 33 enclose the angle $\beta$ so that conical cut configurations 39 are produced in the workpiece 33. The relative movement between the wire electrode is effected in the same manner as described in the context of FIG. 1 and 2. The peculiarity of the holding device 3 of FIG. 3 resides in the fact that the plane defined by the angle $\beta$ which lies in the drawing plane is normal to the cutting direction of the wire electrode 36. This makes it possible for conical cut configurations to be produced on the polar co-ordinate system. By way of example, conical gears are cut from the workpiece 33 in this manner, only on the tooth pitch requiring to be programmed. If one tooth pitch has been cut, the workpiece 33 must be so rotated by means of the rotary table 34 that the end point of the path curve becomes the starting point of the new path curve or tooth pitch. With this rotation of the workpiece 33 the wire electrode 36 must rotate as well so that the plane formed by the angle $\beta$ is always normal to the direction of cutting. This is effected by the driving motor 26 which is connected, via shafts 27, with the two small rotary tables 38. The motor 26 is controlled by the additional components of the circuit arrangement shown in FIG. 8. Control is performed by data in the information carrier. This will later be described in greater detail in connection with FIG. 5. In FIG. 5 the angle β is set manually. By means of the adjusting screw 40 the relative position of the pins 37 is adjusted in the manner desired. If the data for the conicity angle β are also stored in the information carrier, control is preformed by the additional components shown in FIG. 6 in co-operation with FIG. 5. This will later be described in more detail. The conicity of the cut faces 39 can be adjusted during the relative movements between the wire electrode and the workpiece. It is here again pointed out that this is possible not only with the holding device according to FIG. 3 but also with the device shown in FIGS. 1 and 2. In adjusting the conicity, i.e. when the wire electrode 36 is placed in inclined position, it must be ensured that the theoretical point of intersection 41 of the wire electrode 36 with the center line of the rotary table 24 is located on the upper or lower face of the workpiece 33. Only thus can it be ensured that equidistant path curves are produced on the upper and lower faces of the workpiece.

Figure 4:
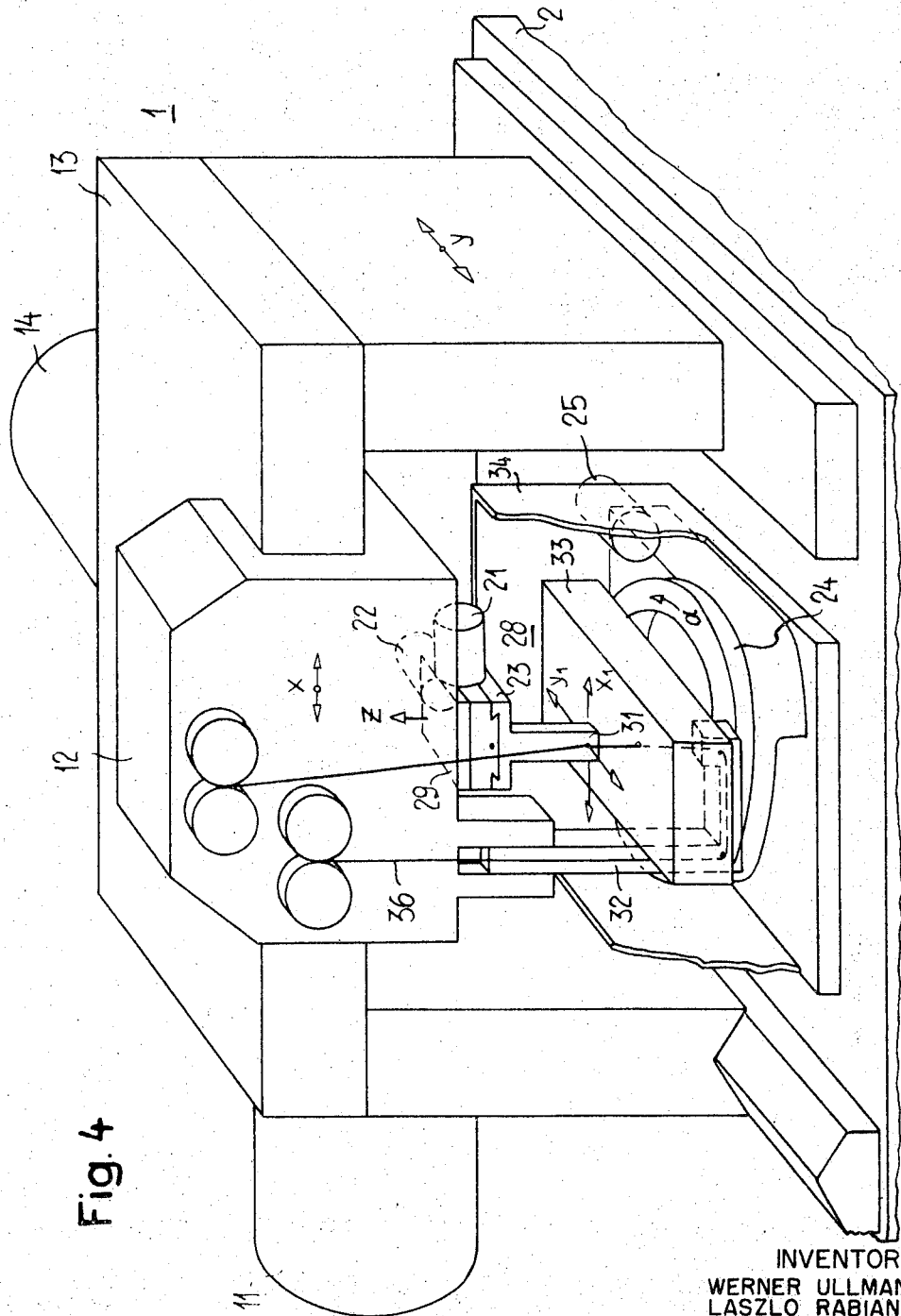
FIG. 4 is a perspective view of an advancing device consisting of a large and a small cross-table and a large rotary table.

FIG. 4 represents a combination of a large cross-table 1, a small cross-table 28 and a rotary table 24. The large cross-table accommodates the mobile component 12, which is displaceable on the x-co-ordinate, and the mobile component 13 which is displaceable on the y-co-ordinate. A driving motor 11, 14 is provided for each mobile component. Attached to the mobile component 12 is the small cross-table 28 with the mobile component 29 displaceable on the $x_1$-co-ordinate and the mobile component 23 displaceable on the $y_1$-co-ordinate. The driving motors 21, 22 displace the mobile components 28 and 29. Arranged on the mobile component 23 is the wire guide 31. The other wire guide 32 is located in the mobile component 12 of the large cross-table 1. As previously stated, the wire electrode 36 is moved from a supply spool via guide rollers, the two wire guides 31, 32 and further guide rollers, to the take-up spool. The workpiece 33 is attached to the rotary table 24. The rotary table 24 is rotated in the direction of the α-co-ordinate by the driving motor 25. The rotary table 24, the workpiece 33 and the wire guides 31, 32 are located in the container 34 which as is well known contains the dielectric medium which may, by way of example, be a liquid.

Figure 7:
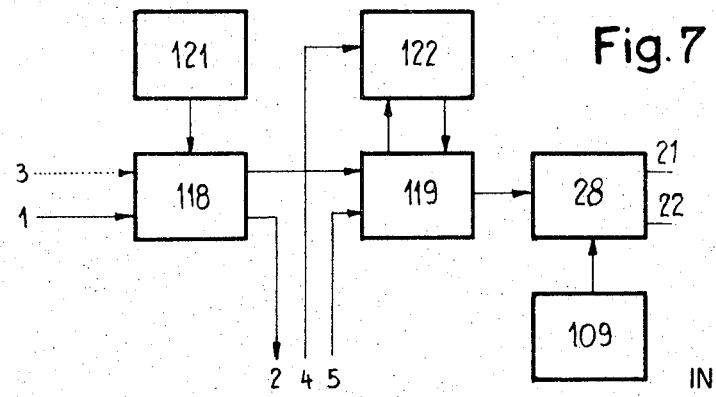
FIG. 7 shows another embodiment of the additional components of FIG. 6.

The driving motors 11, 14, 21, 22, 25 are connected to the associated outlets of the circuit shown in FIG. 5 and to the outlets of the additional components of FIG. 7. The relative movement between the wire electrode 36 and the workpiece 33 for the obtention of the desired path curve in the cartesian and/or polar system of co-ordinates is secured by the large cross-table 1 and the rotary table 24. The conicity, i.e. the angle β between the wire electrode 36 and the surface of the workpiece 33, is adjusted by means of the small cross-table 28. The embodiment of the advancing device according to FIG. 4 thus enables workpiece contours to be cut which are programmed in the cartesian and polar system of co-ordinates. Programming is simplified by the utilization of the kinematic generating rules for these curves.

The simplified embodiment of the circuit of FIG. 5 will now be described. The term "simplified embodiment" is designed to be understood in the sense that the cross-table 1 and the rotary table 24 of FIGS. 1, 2 and 4 are controlled, by virtue of the characteristic data of the path curve stored in an information carrier, on cartesian and polar co-ordinates, the wire electrode 36 not being required to produce conical cuts in the workpiece 33. Accordingly, the points a, b, c, d are shown interconnected in FIG. 5. In an information carrier which may be designed as a punched tape or magnetic tape are stored, in the known manner, the data which control the relative movement between the wire electrode 36 and the workpiece 33. It is now assumed that the information carrier employed is a punched tape of which the data are read into the buffer memory in blocks as known by the input 100, which is a punched-tape reader in this embodiment. From this buffer memory the information passes to a code converter 103 which must be provided in the event that the information received from the punched tape is to be digitally code converted. The code converted information then passes into the correcting computing unit 104. The correcting computing unit 104 calculates, from the characteristic points of the desired workpiece contour supplied by the punched-tape reader 100, the corresponding characteristic points of the path of the axis of the wire electrode 36. To this end it receives, from the manual input 107, the values of the diameter of the wire electrode 36 and the width of the working gap. If desired, these data relating to the wire diameter and the gap width can be stored in the punched tape as additional information so that manual input 107 can be dispensed with. It is also possible for the manual input 107 to correct the data read from the punched tape relating to the wire diameter and the gap width. The output signals of the correcting computing unit thus indicate the path curve which must actually be travelled by the axis of the wire electrode 36. This path of the axis is parallel with the contour which is to be cut from the workpiece 33. The output signals of the correcting computing unit 104 are supplied to the computing unit 105 which calculates the path curve of the axis of the wire electrode 36 in a first section in accordance with a predetermined programme. Termed predetermined programme are geometrical shapes such as a straight line, a circle, ellipsis, parabola and the like. Stored in the predetermined Programme are the characteristic points of the geometrical shapes.

Depending on the path curve that the wire electrode is called upon to travel, the corresponding curve lengths of the various geometrical shapes are composed. The curve lengths of the path curve so defined are supplied, in a second section of the computing unit 105 by means of one of the known interpolation processes, to the driving motors 11, 14 of the cross-table 1 in the form of control signals, the said cross-table being displaceable on the x and y-co-ordinates (FIGS. 1 and 4) or only on the y-co-ordinate (FIG. 2). The computing unit 105 supplies the values for the characteristic points of the path curve, which were programmed in the polar system of co-ordinates, to the computing unit 123. The α-computing unit 123 is designed exactly like the computing unit 105. In a first section the characteristic points programmed in polar co-ordinates are converted, in accordance with a predetermined programme, into the path curve of the axis of the wire electrode 36. Designed as a predetermined programme is a straight line, a circle, ellipsis, parable and the like. Depending on which path curve the wire electrode 36 is to travel, the corresponding curve lengths of the individual geometrical shapes are combined. The curve lengths of the path curve so determined are supplied, in a second section of the computing unit 123 by means of one of the known interpolation processes, to the driving motor 25 of the rotary table 24 in the form of control signals. The interpolation process used in the two computing units 105, 123 may be the search-step process also known as iteration interpolation, or the DDA - Digital Differential Analyzer - or approximation method. For this reason no detailed explanations of the mode of operation of the second section of the two computing units are given. Each computing unit contains a return memory 108, 125. These two return memories are shown as individual boxes in FIG. 5. Normally, however, they are incorporated in the computing units 105 and 123. The return memory 108 stores the characteristic points of the path curve which are programmed in the cartesian system of co-ordinates (x, y) and processed by the computing unit 105. The return memory 125 stores the characteristic points of the path curve programmed in the polar system of co-ordinates $\alpha$ and processed in the computing unit 123. In this manner a curve length or several subsequent curve lengths which the wire electrode 36 has travelled are stored. This storage of the curve lengths is effected for the purpose of interpolating, in the event of trouble or a short-circuit occurring in the working gap 111, the length travelled by the wire electrode 36, which may be a curve length or several curve lengths and of which the characteristic points are stored in the return memory, in inverse order. Since the direction of interpolation is in that case inverted, the contents of the return memories 108, 125 must be given opposite signs. In addition, a counter is provided which contains the number of interpolation steps to the next characteristic point of the path curve. The control signals of the "inverse direction" for the co-ordinates x and y are supplied to the driving motors 11, 14 of the cross-table 1. If the advance direction of FIG. 2 is used, the advancing motor 14 for the motion on the x-co-ordinate can be dispensed with. The control signals of the "inverse direction" for the polar co-ordinate $\alpha$ is supplied to the control motor 25 of the rotary table 24 by the computing unit 123. The trouble in the working gap 111 is sensed by the monitoring device 110 which supplies a trouble signal to the inlets of the computing units 105, 123. This trouble signal ensures that the computing units do not supply further control impulses in the "forward direction" to the driving motors of the cross-table 1 and the rotary table 24. The wire electrode therefore remains in its position. The trouble signal further causes the characteristic values of the curve lengths or curve length stored in the memories 108, 125 to be interpolated in the inverse direction. The "return" control signals are supplied to the driving motors of the cross-table 1 and the rotary table 24 so that the wire electrode 36 returns along the same path curve. The return movement continues until the monitoring device has sensed that the trouble or short-circuit in the operating gap 111 has been remedied. In that case the monitoring device 110 supplies a further signal to the inlets of the computing units 105, 123 and the return memories 108, 125. This causes the characteristic values of the curve lengths or curve length stored in the return memories 108, 125 again to be interpolated in the forward direction. The wire electrode 36 proceeds to the point where the trouble or short-circuit has occurred. When that position is reached, the characteristic values of the curve length are interpolated which is the next following. In other words, the normal advance of the wire electrode now proceeds. It is here pointed out that the memories 108 and 125 described store the characteristic points of a patch curve.

The term "characteristic points of the path curve" implies that only the most significant points of the path curve are stored. The intermediate points are not stored but interpolated. In this manner a greater number of curve lengths can be stored in a comparatively small memory capacity of the means 108 and 125 so that the wire electrode 36 can return by a great length.

The memories 108 and 125 may also be so designed that they store the control signals which the associated computing unit 105, 123 supplies to the driving motors 11, 14, 25. These previously interpolated control signals are no longer the characteristic points of the path curve but constitute the points of the path curve located between the characteristic points. It is obvious that in this case no great length of the path curve can be stored in the return memory. The comparison between the one memory type which stores the characteristic points of the path curve and the other memory type which stores the control signals reveals that the type first-named is to be preferred with similar storage capacity.

The cross-table 1 and the rotary table 24 are connected to the manual input 109. By means of the manual input the driving motors 11, 14, 25 can be manually controlled. This may be necessary in the event that the data stored in the punched tape must be complemented or corrected. Practive has shown that such manual complementation or correction may at times be desirable.

Provided for the control of the processes so far described in the circuit according to FIG. 5 is the computing clocking generator 113. For reasons of simplification the lines of influence between the clocking generator and the various components are not shown. The punched tape reader 100 supplies, via the buffer memory 102, the data important for control to the clocking generator 113. These data are e.g. "programme start", "programme end", "positioning of the wire electrode at starting point of cut," "data regarding the type of interpolation by the computing units 105, 125," data for the control of the electrical parameters (such as current, voltage, repetitive frequency, width, intervals of impulses and/or double impulses or igniting impulses) to be supplied to the erosion generator or erosion generators 114, and data relating to the control of the flushing conditions of the dielectric medium. Box 114 thus designates at least one erosion generator, the apparatus for the control of the flushing conditions and for manipulation which are manually effected directly on the advancing means 1, 2, 3 and 4. These manipulations have nothing in common with the manual inputs 107, 109, 112, 128, 133, 122. The manual input 112 enables the said important data supplied to the clocking generator 113 via the buffer memory 102 to be corrected and complemented. In practice the complementation and, respectively, correction of the data passing the clocking generator may prove to be useful.

The circuit of FIG. 5 so far described thus enables all current contours to be cut from the workpiece 33 by means of the wire electrode 36. As previously mentioned, programming is simplified by the fact that the generating rules of curves can be utilized. This is possible only by the combination of the individual components described. If the rotary table 24 is not rotated and only the mobile components 12, 13 of the cross-table 1 in FIG. 1 are displaced, path curves can be cut which are programmed on cartesian co-ordinates. If the cross-table 1 and the rotary table 24 are controlled, complex curves can be produced with simple programming in the cartesian system of coordinates and in the polar system of coordinates. If the rotary table 25 is controlled while the cross-table 1 is not displaced, cylindrical cut configurations programmed in the polar system of co-ordinates can be produced. The said possibilities of combination with the advancing devices 1, 24 of FIG. 1 are substantially larger in reality. With the simplified advancing devices 1, 24 of FIG. 2, contours which are not composed of complex curve lengths can be cut from the workpiece 33. By way of example cylindrical workpiece contours programmed in a polar system of co-ordinates can be produced. The advancing devices of FIG. 4 have the same possibilities of combination as the advancing devices of FIG. 1. The small cross-table 28 of FIG. 4 is not provided in this case. The small cross-table 28 is designed for conical cutting, which will be described later.

The circuit of FIG. 5 has so far been described only to the extent that no conical contours 39 could be cut from the workpiece 33. Additional components according to FIGS. 6, 7, 8 enable conical cut configurations to be produced with the wire electrode 36. As previously mentioned, the setting of conicity is effected by the device 37 of the FIGS. 1, 2, 3 or the small cross-table 28 of FIG. 4, the data for the conicity being stored in the punched tape.

In order to give a simple illustration of the problems arising in conical cutting, reference is first made to the holding device 3 in FIG. 3. The wire electrode 36 is adjusted to the conicity angle $\beta$ to the surface of the workpiece 33. In FIG. 3 this angle has been manually set by means of the adjusting screws 40. It is also readily possible for the conicity to be stored in the punched tape 100 together with the other data of the workpiece contour and to be adjusted via additional components of FIGS. 6 or 7. Conical cutting however requires additional data. According to FIG. 3 the distance B between the two pins 37 and the distance A between the lower pin and the lower face of the workpiece 33 must be indicated. The distance A may also be defined by the upper pin 37 and the upper face of the workpiece 33. The distance A indicates the distance of the theoretical point of intersection 41 from the pin 37. The theoretical point of intersection 41 of the wire electrode 36 must at all events be located on the center line of the two rotary tables 38. The plane defined by the angle $\beta$ and located in the drawing plane of FIG. 3 must always be normal to the direction of cutting of the wire electrode 36 in conical cutting. The direction of cutting in FIG. 3 is away from the viewer and normal to the drawing plane. If the direction of the path curve changes in accordance with the desired programmed curve length, the plane represented by the angle $\beta$ must change as well. This is effected by means of the two small rotary tables 38. The driving motor 26 is controlled by the additional components of FIG. 8.

For conical cutting data for the angle $\beta$, for the distance A, B and for the normal setting of the plane defined by the angle $\beta$ to the direction of cutting must be stored, besides the data for the workpiece contour, in the punched tape.

The conical cutting with the advancing device 1 of FIGS. 1 and 2 will now be described, reference being made to the more detailed description of the holding device 3 in FIG. 3. Used for the control of this advancing device are the additional components of FIGS. 6 and 8 which are incorporated in the circuit of FIG. 5 via lines 3, 4, 5, 6, 7. The points $a, b, c, d$ in the principal connecting line of FIG. 5 are interconnected as indicated.

The data supplied by the punched tape are supplied, via the components 102, 103, 104 previously described, to the computing unit 105 which causes, one the strength of the data of the characteristic path curve, the displacement on the x and y-coordinates by controlling the driving motors 11, 14 of the cross-table 1. The computing unit 105 supplies, via the line 6, the data of the characteristic path curve programmed in the polar system of coordinates to the $\zeta$-computing unit 123 which calculates and interpolates the rotary movement of the rotary table 24 for supply to the driving motor 25. The data for the conicity (angle $\beta$, distances A, B) are separated from the said characteristic path data and the buffer memory 102 and supplied to the circuit 116. The conicity data thence pass to the conicity computing unit 130 of FIG. 6 via the line 3. This computing unit calculates and interpolates these data and supplies the control signals to a driving motor 37 of FIGS. 1, 2 and 3. This control motor 132 is shown in FIG. 3 only. For the correction and, respectively, complementation of the conicity data supplied by the punched tape 100, control signals may be supplied, by the manual input 133 of FIG. 6, to the driving motors and, respectively, the driving motor 132 of FIGS. 1, 2 and 3. The conicity computing unit 130 comprises a return memory 131 which operates on the same principles as the return memories 108, 125 previously described. In the event of trouble in the operating gap 111 the return memory 131 receives, via the line 4, the trouble signal from the monitoring device 110. Via the line 5 the conicity computing unit 130 receives a signal from the monitoring device 110 as soon as the trouble in the operating gap 111 is remedied. During the period between those two signals the return memory 31 causes the wire electrode to return in the same direction. Upon receiving the second signal the return memory causes the wire electrode 36 again to advance to the position where the trouble in the operating gap 111 has occurred. When the wire electrode returns, the conicity is maintained so that the wire electrode is not damaged. If the conicity has been changed during the normal erosive processing in the forward direction, this change in conicity is also considered as the wire electrode 36 returns. The conicity computing unit 130 is a simple correcting computer in the described example according to FIGS. 1, 2, 3, 5 and 6.

Figure 8:
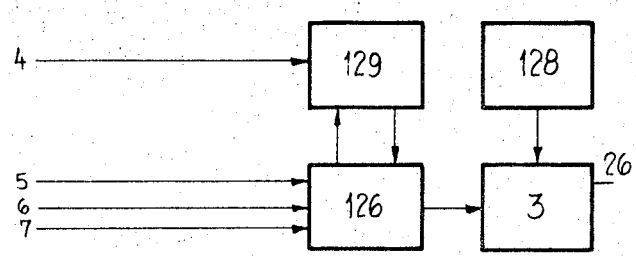
FIG. 8 shows a further embodiment of the additional components of the holding device shown in FIG. 3.

In order to ensure that the plane defined by the angle $\beta$ is always located in the direction of cutting, either the additional components of FIG. 8 or the $\alpha$-computing unit 123 may be employed.

The additional components of FIG. 8 are employed if the wire electrode 36 cooperates with the small rotary tables 38 of the holding device according to FIG. 3. However, if the two small rotary tables 38 are not present, as shown with the wire guides 31, 32 of FIGS. 1 and 2, the rotary table 24 must rotate the workpiece 33 in such a manner that the plane formed by the angle $\beta$ is always normal to the cutting direction of the wire electrode 36. Now we will revert to the description of FIG. 8 with the holding device 3 of FIG. 3. The computing unit 126 of FIG. 8 receives, via the lines 6, 7, the data of the characteristic path points from the computing units 105, 123, and calculates the normal position of the plane defined by the angle $\beta$ relative to the cutting direction of the wire electrode 36. These control impulses are supplied to the motor 26 of the holding device 3. The computing unit 126 comprises a return memory 129 which operates on the same principle as the memories 108, 125 previously described in the context of the mode of operation of the computing units 105, 123. The return memory 129 may thus also store only the characteristic path points or only the control impulses supplied to the motor 26. The line 4 connects the return memory 129 to the monitoring device 110 so that the trouble signal can be supplied to the return memory 129 from the monitoring device 110. The computing unit 126 is connected to the other outlet of the monitoring device 110 via the line 5. As previously described, the monitoring device supplies a signal via this line when the trouble in the operating gap 111 has been remedied. If necessary, the control signals supplied to the motor 26 can be complemented or corrected by means of the manual input 128.

FIG. 7 shows the additional components which are necessary for the particular embodiment of the advancing device according to FIG. 4. The conicity computing unit 118 is incorporated, via the line 1, 2, in the circuit of FIG. 5. The connection between the points c and d in the principal line is in that case broken. The data supplied by the punched tape pass, via the components 102, 113, 104 and the conicity computing unit 118, to the computing unit 105 which in its turn supplies the characteristic data to the computing unit 123. The data for the conicity, such as the distances A, B, angle $\beta$, pass from the punched tape via the buffer memory 102 and circuit 116, line 3, to the conicity computing unit 118 which supplies the said converted data to the computing unit 119. This unit 119 operates on the same principle as the computing units 105, 123, 126 referred to above. The return memory 122 operates, together with the computing unit 119, in a similar manner as the return memories 108, 125 with the associated computing units 105, 123. The manual input 121 enables the data for conicity supplied by the punched tape to be changed or corrected. The control signals supplied by the computing unit 119 pass to the driving motors 21, 23 of the small cross-table 26 of FIG. 4. The manual input 109 enables the driving motors to be actuated manually. If the wire guide 31 arranged on the mobile component 23 of the small cross-table 28 of FIG. 4 is moved on the $x_1$ and $y_1$-coordinate relative to the other wire guide 32 which is fixedly attached, to the mobile component 12 of the large cross-table 1, a certain angle $\beta$ is formed and this angle is not entered in FIG. 4 for the sake of greater clarity. The adjustment of the distance B is effected by a further driving motor which can displace the small cross-table 28 on the z-coordinate. This is not shown in detail, again for the sake of greater clarity, but merely indicated by the arrow Z in FIG. 4. The plane defined by the angle $\beta$ is placed normally to the direction of cutting of the wire electrode 36 by rotating the rotary table 24. In that case the additional components of FIG. 8 are not required.

The circuit 116 of FIG. 5 will now be described. This circuit receives, from the buffer memory 102, the additional information stored in the punched tape. This additional information may be the following:

a. data for the correcting computing unit 104, such as the diameter of the wire electrode 36 and the width of the operating gap 111;

b. data for the conicity computing units 130 (FIG. 6) and 118 (FIG. 7), such as the conicity angle $\beta$, distances A, B;

c. data for the monitoring device 110, such as the roughness of the cut surface eroded in the workpiece by the wire electrode 36, cutting velocity of the wire electrode 36, width of the operating gap 111;

d. data for the control of the electrical parameters for the erosion generator 114, such as current, voltage, repetitive frequency, width, pause of impulses and/or double impulses and, respectively, ignition impulses;

e. data for the adjustment or modification of the flushing conditions of the dielectric medium to the device 114, and f. data for the circuit 117 yet to be discussed (FIG. 5), such as the angle by which the system of coordinates of a congruent curve length must be rotated.

Such additional information supplied by the punched tape may, if necessary, be corrected by the manual inputs 107, 115, 121.

The monitoring unit 110 has one of its inlets connected to the operating gap 111 and determines the conditions in the said gap on the strength of the voltage or the current or the frequency. This monitoring unit supplies, in the case of trouble in the operating gap 111, via the line 5, a trouble signal to the computing units 105, 123, 130, 119, 126. Via the line 4 the monitoring unit 110 supplies a control signal to the return memories 108, 125, 131, 122, 129 associated with the various computing units to the effect that the wire electrode 36 is returning. When the trouble in the operating gap 111 is remedied, the monitoring unit supplies appropriate signals via the lines 4, 5 so that the wire electrode 36 can again advance to the position here the trouble has occurred. Subsequently, the data supplied by the punched tape assume control of further erosion. The monitoring unit 110 is connected to a manual input 115 by which values relating to the desired roughness of the cut face in the workpiece 33, the cutting velocity and the gap width can be manually fed into the monitoring device. These values may also be stored in the punched tape. In that case they would be supplied to the monitoring unit 110 via the circuit 116.

It is therefore also possible with the manual input 115 to correct or replace the additional information supplied by the punched card, via the circuit 116, to the monitoring unit 110. Provided in the principal connecting line between the correcting computing unit 104 and the computing unit 105 of the circuit according to FIG. 5 is a circuit 117 which converts the characteristic data of a curve length or an individual contour into the curve lengths rotated by a certain angle. This process can be variously repeated following a punched-tape input. The programming of curves in thereby greatly simplified. The electronic indexing unit 117 is shown in broken lines between the points a and b of the connecting line in FIG. 5, which is to be so interpreted that this indexing unit can be switched into the connecting line as desired. If a workpiece contour can be combined of several congruent lengths, it has, in the circuit according to FIG. 5 so far discussed, been tacitly assumed that the curve lengths must be individually and consecutively programmed into the punched tape. Using the electronic indexing unit 117 requires only one of the congruent curve lengths to be programmed in the punched tape. The curve lengths following, which differ from the previous curve length only by their position in the programming plane are, by way of example, converted by rotation of the system of coordinates in the indexing unit 117. The change in the position of the curve length may be fully described by an indication of angle if the rotation of the curve lengths is effected about the same center of rotation. The indication of angle, also present in the punched tape, and the data of the characteristic path points are processed by the indexing unit 117 in such a manner that the wire electrode 36 travels along the congruent curve length, the same data of the characteristic path points being employed as in the previous curve length. The sole difference resides only in the fact that the system of coordinates has been rotated. The electronic indexing unit is described in greater detail in another patent application.

What is claimed is:

1. An electro-eroding machine with a circuit for the control of at least one advancing device for a wire electrode and/or a workpiece to a workpiece contour predetermined by data stored in an information carrier, the said data being converted, considering the diameter of the wire electrode, the erosive condition in the operating gap and the width of the operating gap, into the path curve of the axis of the wire electrode, characterized by the fact that at least two computing units are provided which calculate the path curve of the axis of the wire electrode on the strength of the converted data and a predetermined programme, of which the first computing unit supplies control signals, by means of an interpolating process, to driving means of the advancing device for a straight movement while the other computing unit supplies control signals, by an interpolation process, to driving means of the advancing device for a rotary movement, each computing unit comprising return memories which return the wire electrode by a certain length of the path curve in the event of trouble in the operating gap.

2. An eroding machine according to claim 1 characterized by the fact that a control circuit is provided for setting a certain angle between the wire electrode and the surface of the workpiece, the said control circuit being supplied with the data for the angular adjustment via a second circuit by the information carrier or by an input.

3. An eroding machine according to claim 2 characterized by the fact that the control circuit connected to the second circuit and a monitoring device supplies its control signals to a driving motor of a holding device for the wire electrode.

4. An eroding machine according to claim 2 characterized by the fact that the control circuit supplies its output signals to computing units, each computing unit being associated with an advancing device and that each computing unit can be influenced by a monitoring device.

5. An eroding machine according to claim 1 characterized by the fact that a correcting computing unit is provided which converts the data determining the workpiece configuration is consideration of the diameter of the wire electrode and the width of the operating gap into corrected data for the path curve, the correcting computing unit being connected to a manual input or with the second circuit for the supply of the wire diameter and the gap width.

6. An eroding machine according to claim 1 characterized by the fact that the second circuit is provided between the information carrier input, a correcting computing unit, the control circuit, the monitoring device and the erosion generator for the supply of the data for the angular adjustment and the data for the control of the electrical parameters on the erosion generator.

7. An eroding machine according to claim 1 characterized by the fact that the memories are designed as return memories and that each computing unit has associated therewith a return memory, each return memory being so adjusted that it stores the control signals supplied by the associated computing unit to the driving motors and supplies, by a trouble signal from a monitoring device which stops the control signals coming from the computing unit, the control impulses of the last length of the curve path to the driving motors so that the wire electrode returns by a certain length.

8. An eroding machine according to claim 1 characterized by the fact that the memories of each computing unit are arranged to store the characteristic points of the curve path and adjusted so that, in the presence of a trouble signal supplied by a monitoring device which interrupts the supply of the control impulses from the computing unit for the further erosive advance of the wire electrode, the stored characteristic points are interpolated in the inverse order and supplied to the driving motors so that the wire electrode returns by a certain length.

9. An eroding machine according to claim 1 characterized by the fact that an indexing unit is arranged between the correcting computing unit and the circuit designed as a conicity computing unit, the said indexing device being designed for the displacement of the system of coordinates.

10. An eroding machine according to claim 1 characterized by the fact that a monitoring device is provided which, in the event of changes in conditions in the operating gap, influences the electrical parameters of the eroding generator, the return memories, and the computing units.

11. An eroding machine according to claim 1 characterized by the fact that the advancing device designed as a cross-table which comprises, for the straight movement, at least one mobile component displaceable in the direction of one coordinate, the wire guides of the wire electrode being attached to the one mobile component while the advancing device for the rotary movement designed as a rotary table is attached to the other mobile portion.

12. An eroding machine according to claim 1 characterized by the fact that the advancing device for the straight movement consists of the two cross-tables and that the one wire guide for the wire electrode is attached to one cross-table and the other wire guide for the wire electrode is attached to the other cross-table, and the advancing device for the rotary movement is designed as a cross-table accommodating the workpiece.

13. An eroding machine according to claim 12 characterized by the fact that the first computing unit is connected to the computing units for the cross-tables and with the monitoring device.

14. An eroding machine according to claim 1 characterized by a holding device with a cross-table at each wire guide for the adjustment of the plane defined by the conicity relative to the direction of cutting of the wire electrode, and a driving motor controlled by the computing unit actuating the cross-tables.

* * * * *